United States Patent Office 3,711,504
Patented Jan. 16, 1973

3,711,504
PROCESS FOR PREPARING ALKYL 2-BENZIMIDAZOLECARBAMATES
Charles D. Adams, Newark, and Joel B. Wommack, Jr., Claymont, Del., assignors to E. I. du Pont de Nemours and Company, Wilmington, Del.
No Drawing. Filed July 6, 1970, Ser. No. 52,700
Int. Cl. C07d 49/38
U.S. Cl. 260—309.2          4 Claims

ABSTRACT OF THE DISCLOSURE

The alkyl esters of 2-benzimidazolecarbamic acid can be prepared by heating the alkyl esters of 4-(2-aminophenyl)-3-thioallophanic acid or the dialkyl esters of 4,4'-(1,2-phenylenebis)-3-thiallophanic acid with an alkylating agent in the presence of base.

The product alkyl esters of 2-benzimidazolecarbamic acid are useful as fungicides and as intermediates for other fungicides.

BACKGROUND OF THE INVENTION 2-benzimidazolecarbamic acid, alkyl esters are useful as fungicides and as intermediates in the preparation of benomyl and the dialkyl esters of 1-carboxy-2-benzimidazolecarbamic acid. These latter compounds and their fungicidal activity are set forth in detail in U.S. Pat. 2,933,504.

Belgian Pat. 720,987 describes the production of these 2-benzimidazolecarbamic acid, alkyl esters by the reaction of the alkyl bis(alkyl or arylthio)methyleneaminoformates with o-phenylenediamines.

U.S. Pat. 3,010,968 describes another process for making alkyl esters of 2-benzimidazolecarbamic acid by reacting thiourea with dimethyl sulfate to produce 2-methylthiopseudourea sulfate. This reaction product is then treated with an alkyl chloroformate and a base to produce an acylated 2-methylthiopseudourea, which is then reacted further with an o-phenylenediamine in the presence of a protonic acid to produce the desired compound.

SUMMARY OF THE INVENTION

This invention relates to a new process whereby alkyl esters of 2-benzimidazolecarbamic acid are prepared by heating certain thioallophanic acid alkyl esters with an alkylating agent in the presence of base according to this equation:

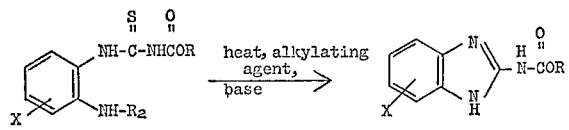

wherein

X is hydrogen or alkyl of 1 to 4 carbons, preferably hydrogen;
R is methyl, ethyl, isopropyl or sec-butyl; preferably methyl or ethyl; and
$R_2$ is hydrogen or

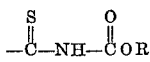

preferably hydrogen.

DETAILED DESCRIPTION OF THE INVENTION

The thioallophanic acid alkyl ester reactants of the invention can be either the alkyl esters of 4-(2-aminophenyl)-3-thiallophanic acid or the dialkyl esters of 4,4'-(1,2-phenylenbis)-3-thioallophanic acid. These reactants may or may not be substituted on the aromatic ring with other alkyl groups and have the following structural formula:

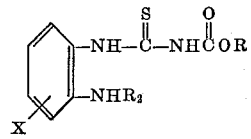

where

X is hydrogen or alkyl of 1 to 4 carbon atoms;
R is methyl, ethyl, isopropyl or sec-butyl; and
$R_2$ is hydrogen or

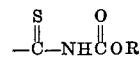

where R is as defined above.

These thioallophanic acid, alkyl ester starting materials can be prepared by the methods known in the art, e.g., South African patent application 68/6736 and 69/4362.

Thus, the dialkyl esters can be prepared from potassium thiocyanate, an alkyl chloroformate, and o-phenylenediamine by the following two-step procedure:

(1) $$ROCCl + KNCS \longrightarrow ROCNCS$$

(2)
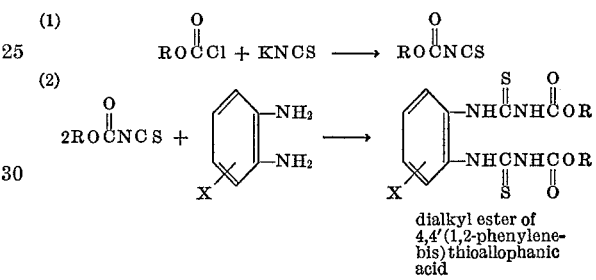

dialkyl ester of 4,4'(1,2-phenylenebis)thioallophanic acid where X and R are as previously defined.

The above reactions can be conducted in acetone solvent. A preferred method is to add the alkyl chloroformate to a solution or slurry of potassium thiocyanate in acetone. An exothermic reaction occurs and cooling is provided if a temperature rise is unwanted. After stirring for 1–2 hours, the reaction mass is filtered in order to remove potassium chloride.

The filtrate from step 1 is added to a solution or slurry of o-phenylenediamine in acetone. An exothermic reaction occurs and cooling must again be provided if a temperature rise is to be avoided. The reaction mass is stirred for 1–2 hours, cooled, and filtered in order to recover the product.

The alkyl ester of 4-(2-aminophenyl)-3-thioallophanic acid is prepared by a modified procedure which is described by the following equations.

(1) $$ROCCl + KNCS \longrightarrow ROCNCS + KCl$$

(2)
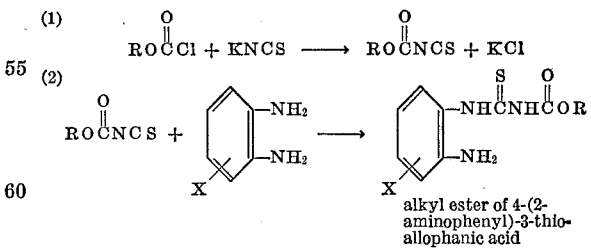

alkyl ester of 4-(2-aminophenyl)-3-thioallophanic acid

Exemplary embodiments of the processes for making the intermediates are as follows:

Dimethyl 4,4'-(1,2-phenylenebis)-3-thioallophanate

Methyl chloroformate (47.3 parts) is added over 10 minutes to a slurry of 48.5 parts of potassium thiocyanate in 200 parts of acetone. External cooling is used to keep the temperature below 40° C. during the addition. The reaction mass is stirred at ambient temperature for an hour, cooled, and filtered.

The filtrate is added over 5 minutes to an ice-bath cooled solution of 27.5 parts of o-phenylenediamine in 200 parts of acetone. The reaction mass is stirred at ambient temperature for an hour, cooled, and filtered in order to recover the product. This procedure gives 35 parts of dimethyl 4,4' - (1,2-phenylenebis)-3-thioallophanate, M.P. 180° C. with decomposition.

Methyl 4-(2-aminophenyl)-3-thioallophanate

Methyl chloroformate (47.5 parts) is added with cooling to 48.8 parts of potassium thiocyanate in 200 parts of acetone. The reaction mass is stirred for an hour at ambient temperature and filtered. The filtrate is then added with cooling to 54.0 parts of o-phenylenediamine in 80 parts of acetone. The reaction mass is stirred for an hour at ambient temperature and then evaporated to dryness. The residue is taken up in 180 parts of methanol, cooled, and filtered in order to recover the product. This procedure gives 16.0 parts of methyl 4-(2-aminophenyl)-3-thioallophanate, M.P. 187° C. with decomposition.

In the process of this invention the appropriate alkyl thioallophanate is heated with an alkylating agent in the presence of base. These reactions are illustrated by the following equations when dimethyl sulfate is the alkylating agent and sodium hydroxide is the base.

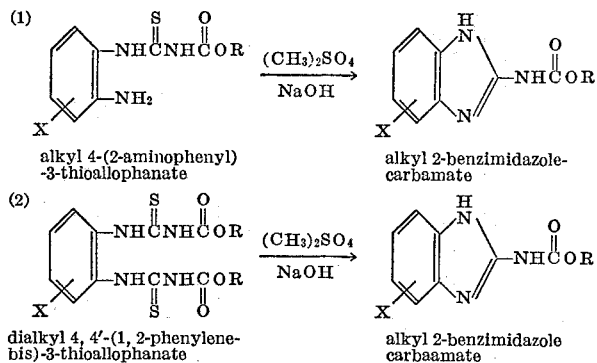

where X and R are as previously defined.

In the above processes, if desired, mixtures of a monothioallophanate ($R_2$ is hydrogen) with the corresponding dithoallophanate

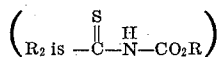

can also be used to form the desired alkyl 2-benzimidazolecarbamates.

It is presumed that the role of the alkylating agent is to alkylate the sulfur atom of the thioallophanic acid ester. The alkyl sulfur function is subsequently split out as an alkyl mercaptan during the ring closure reaction. The evidence for this course of events lies in the fact that mercaptans which correspond to the alkylating agents used are detected as reaction by-products. For example, when dimethyl sulfate or methyl iodide are used as akylating agents, methyl mercaptan is a reaction by-product. Or when diethyl sulfate or ethyl bromide are used, ethyl mercaptan is a reaction by-product.

It can be seen that alkylating agent used is not critical to the success of the reaction provided that it is capable of akylating the sulfur atom and that the sulfur atom is subsequently split out in a mercaptan form. A list of alkylating agents which can be used includes, but is not limited to, ethylene halohydrins, allyl halides, e.g., allyl bromide or allyl choride, ethyl halides, methyl halides, e.g., methyl chloride, methyl iodide or methyl bromide, benzyl halides, e.g., benzyl bromide or benzyl chloride, dialkyl sulfates, e.g., dimethylsulfate, epihalohydrins, and halomethyl alkyl ethers. The role of the alkylating agent can be illustrated by the following equations when the base is sodium hydroxide:

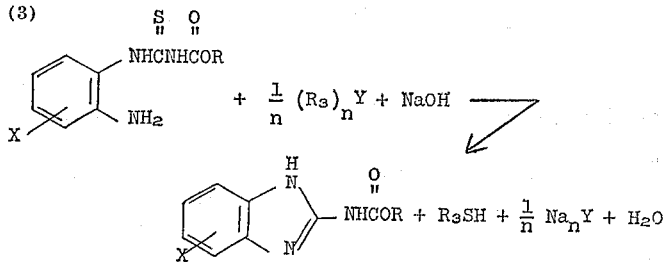

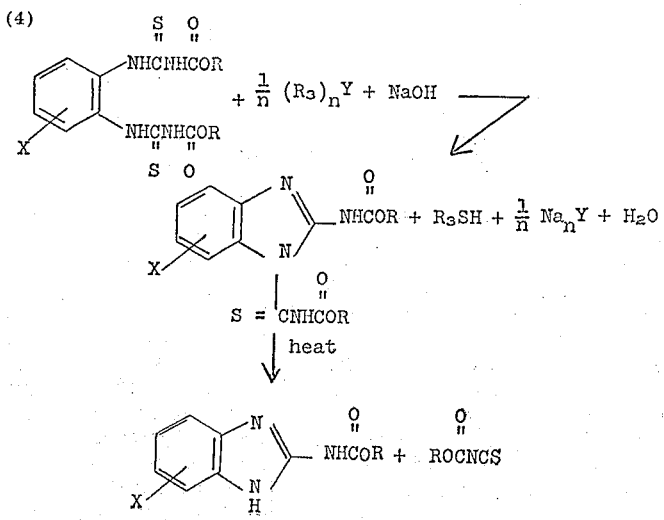

where

R and X are the same as previously described,
$(R_3)_nY$ is an alkylating agent and $n$ is 1 or 2 depending upon whether Y is a halide or sulfate function.

The selection of the alkylating agent is governed by factors of economics and convenience of mercaptan removal. Normally, the cheapest and most readily available alkylating agents such as dimethyl sulfate or methyl chloride would be selected over more expensive and less readily available alkylating agents. Dimethyl sulfate and methyl chloride have the additional advantage that the by-product methyl mercaptan is extremely volatile and therefore easily separated from the reaction products. Less volatile mercaptans are harder to remove and they may tend to give the product an obnoxious odor.

The role of the base is to catalyze the reaction between the alkylating agent and the sulfur atom of the thioallophanic acid ester. Suitable bases include the oxides, hydroxides, carbonates and bicarbonates of the alkali metals and the alkaline earth metals. Preferred bases are sodium hydroxide, sodium carbonate, potassium hydroxide, potassium carbonate, and calcium hydroxide. Suitable bases also include quaternary ammonium hydroxides such as tetramethylammonium hydroxide or benzyltrimethylammonium hydroxide.

The choice of solvent is not critical. Solvents which can be employed include water, the lower alcohols such as methanol, ethanol, and isopropanol, the lower ketones such as acetone and methyl ethyl ketone, and mixtures of these solvents with each other. Water is a preferred solvent.

The concentration of the reactants is not critical to the operation of the process. It is preferred for economic reasons that the concentrations be as high as possible but not so high that the reaction mass becomes unstirrable or unmanageable. A preferred range is one where the reactants make up from 10 to 70% by weight of the reaction mass.

Molar ratios of the reactants are not critical to the operation of the process. For economic reasons it is undesirable for one of the reactants to be present in large excess. A preferred mole ratio range is from 1:1:1 to 1:2:2 for the thioallophanic acid ester, alkylating agent, and base respectively. These same ratios apply when a mixture of monothioallophanate and dithioallophanate is used as a reactant.

Reaction temperature can be in the range of 50° C. to 150° C. Below 50° C. the reaction proceeds too slowly to be practical and above 150° C. degradative side reactions begin to occur. A preferred temperature range is from 80° C. to 110° C.

The reaction time can vary in the range from 30 minutes to 5 hours. At lower reaction temperatures longer reaction times are required while at higher reaction temperatures shorter reaction times are permitted. A preferred reaction time is from 1 to 3 hours. The end of the reaction can be determined by a cessation of mercaptan production, by an end to precipitation of the product, or by a decline in pH as the base is consumed.

The reaction is generally carried out at atmospheric pressure. However, when volatile alkylating agents such as methyl chloride are used, it may be desirable to use pressures higher than atmospheric.

The best results are obtained when the thioallophanic acid ester is added to the solvent first before the alkylating agent and base are added. Once the thioallophanic acid has been charged to the reactor either the alkylating agent or the base may be charged next. In certain instances it may be desirable to charge the alkylating agent and base simultaneously. When the alkylation reaction is particularly exothermic, it is desirable to add either the alkylating agent or base, or both, over an extended period of time rather than all at once.

The products are all solids and conventional solids-handling methods such as filtration, centrifugation, and spray-drying can be used for product recovery. Often the product will contain inorganic impurities which are removable by water washing techniques. Organic impurities can be removed by washing with solvents such as methanol, ethanol, acetone, and methyl ethyl ketone.

The following examples should serve to better illustrate the nature of this invention; all parts are parts by weight unless otherwise indicated.

EXAMPLE 1

Preparation of methyl 2-benzimidazolecarbamate

Dimethyl sulfate (12.6 parts) is added to a slurry of 17.6 parts of dimethyl 4,4'-(1,2-phenylenebis)-3-thioallophanate in 75 parts of water. The resulting mixture is heated and stirred at 70° C. to 75° C. for 0.5 hour. Then 16.0 parts of 50% sodium hydroxide are added and the resulting mixture is heated and stirred at 93° C. for 2.0 hours. The mixture is cooled to 70° C. and filtered. The solid product is washed liberally with water and acetone and then dried in a vacuum oven at 95° C. This procedure gives 4.4 parts (46% yield) of methyl 2-benzimidazolecarbamate, M.P. 310–20° C. with decomposition.

The same procedure can be followed except that 21.2 parts of sodium carbonate can be used instead of 16.0 parts of 50% sodium hydroxide.

EXAMPLE 2

Preparation of methyl 2-benzimidazolecarbamate

Dimethyl sulfate (2.5 parts) and 50% sodium hydroxide (1.6 parts) are added to a slurry of 4.09 parts of methyl 4-(2-aminophenyl)-3-thioallophanate in 30 parts of water. The resulting mixture is heated and stirred at 95° C. for 3 hours. It is then cooled and filtered. The solid product is washed liberally with water and acetone and dried. This procedure gives 1.25 parts (36% yield) of methyl 2-benzimidazolecarbamate.

The same procedure can be followed except that 2.8 parts of potassium carbonate can be used instead of 1.6 parts of 50% sodium hydroxide.

EXAMPLE 3

Preparation of ethyl 2-benzimidazolecarbamate

Dimethyl sulfate (12.6 parts) and 50% sodium hydroxide (8.0 parts) are added to a slurry of 17.5 parts of diethyl 4,4'-(1,2-phenylenebis)-3-thioallophanate in 80 parts of water. The resulting mixture is heated and stirred at 85° C. for 2.5 hours. It is then cooled to 40° C. and filtered in order to recover the solid product. The ethyl 2-benzimidazolecarbamate so obtained is washed freely with water and acetone and dried in a vacuum oven at 95° C.

EXAMPLE 4

Preparation of ethyl 2-benzimidazolecarbamate

Dimethyl sulfate (12.6 parts) and 50% sodium hydroxide (1.0 parts) are added to a slurry of 23.7 parts of ethyl 4-(2-aminophenyl)-3-thioallophanate in 70 parts of water. The resulting mixture is heated and stirred at 100° C. for 2 hours. It is cooled to room temperature and filtered to recover the solid product. The ethyl 2-benzimidazolecarbamate so obtained is washed freely with water and acetone and dried in a vacuum oven at 95° C.

EXAMPLE 5

Preparation of ethyl 2-benzimidazolecarbamate

Diethyl 4,4'-(1,2-phenylenebis)-3-thioallophanate (17.5 parts) and 87% potassium hydroxide (7.0 parts) are added to 70 parts of absolute ethanol. The resulting mixture is stirred at ambient temperature for 20 minutes, then 12.6 parts of dimethyl sulfate are added. The reaction mass is stirred and refluxed for 1.5 hours, cooled, and filtered to recover ethyl 2-benzimidazolecarbamate. The product is washed liberally with water and acetone and dried in vacuum oven a 95° C.

EXAMPLE 6

Preparation of methyl 2-benzimidazolecarbamate

Methyl 4 - (2 - aminophenyl) - 3 - thioallophanate (22.5 parts), 87% potassium hydroxide (6.5 parts), and methanol (80 parts) are charged to an autoclave. The autoclave is closed and the contents are heated and stirred until the internal temperature reaches 105° C. Then methyl chloride (5.5 parts) is added through an injection pump during 30 minutes. The internal temperature is maintained at 105° C. during the addition by applying heating or cooling water to the autoclave jacket is required.

The temperature is maintained at 105° C. for another 30 minutes, then the autoclave is cooled to room temperature, vented, and drained. The recovered slurry is filtered and the insoluble product is washed freely with water and methanol. This procedure gives a good yield of methyl 2-benzimidazolecarbamate.

EXAMPLE 7

Preparation of sec-butyl 2-benzimidazolecarbamate

A mixture of sec-butyl 4-(2-aminophenyl)-3-thioallophanate (26.5 parts) and calcium hydroxide (3.71 parts) in 100 parts of water is heated and stirred at 95° C. for 10 minutes. Then 15.4 parts of diethylsulfate are added during 15 minutes. The resulting mixture is heated and stirred at 95° C. for 4 hours. It is next cooled to room temperature and filtered. The sec-butyl 2-benzimidazolecarbamate so recovered is washed with water and methanol and dried in a vacuum oven at 95° C.

EXAMPLE 8

Preparation of methyl 5-methyl-2-benzibidazolecarbamate

A mixture of dimethyl 4,4'-(3,4-tolyenebis)-3-thioallophanate (35.6 parts), dimethyl sulfate (25.2 parts), 50% sodium hydroxide (24.0 parts) and 150 parts of water is stirred and refluxed for 3 hours. The resulting reaction mass is cooled to room temperature and filtered. The solid product is washed with water and methanol and dried in a vacuum oven at 95° C. This procedure gives a good yield of methyl 5-methyl-2-benzimidazolecarbamate.

EXAMPLE 9

Preparation of ethyl 5-methyl-2-benzimidazonecarbamate

A mixture of ethyl 4-(2-amino-5-tolyl)-3-thioallophanate (25.1 parts) and sodium hydroxide (4.0 parts) in 100 parts of absolute ethanol is refluxed and stirred for 30 minutes. Then methyl iodide (14.2 parts) is added and refluxing and stirring are continued for 4 hours. The resulting mixture is cooled and filtered. The solid product is washed thoroughly with water and dried in a vacuum oven at 95° C. This procedure gives a good yield of ethyl 5-methyl-2-benzimidazolecarbamate.

EXAMPLE 10

The following alkyl 2-benzimidazolecarbamates can be made from alkyl 4-(2-aminophenyl)-3-thioallophanates by using the procedures described in Examples 2, 4, 6, 7, or 9 and substituting the appropriate molar proportions of the reactants.

The following alkyl 2-benzimidazolecarbamates can be made from dialkyl 4,4'-(1,2-phenylenebis)-3-thioallophanates by using the procedures described in Examples 1, 3, 5, or 8 and substituting the appropriate molar proportions of the reactants.

We claim:
1. A process for preparing an alkyl 2-benzimidazole-carbamate consisting essentially of heating to temperatures of 50 to 150° C. a thioallophanic acid alkyl ester of the formula:

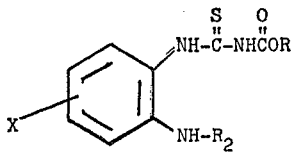

where

X is hydrogen or alkyl of 1 to 4 carbons;
R is methyl, ethyl, isopropyl or sec-butyl; and
$R_2$ is hydrogen or

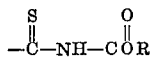

with an alkylating agent selected from the group consisting of ethylene halohydrins, allyl halides, ethyl halides, methyl halides, benzyl halides, dialkyl sulfates, epihalohydrins and halomethyl alkyl ethers and a base selected from the group consisting of (a) the oxides, hydroxides, carbonates or bicarbonates of the alkali metals or the alkaline earth metals or (b) a quaternary ammonium hydroxide selected from the group consisting of tetramethylammonium hydroxide and benzyltrimethylammonium hydroxide.

2. The process of claim 1 wherein the alkylating agent is selected from the group consisting of dimethyl sulfate, methyl chloride, methyl bromide, methyl iodide, benzyl chloride, benzyl bromide, allyl bromide or allyl chloride.

3. A process for preparing methyl 2-benzimidazole-carbamate comprising heating to a temperature of 80° to 110° C. methyl 4-(2-aminophenyl)-3-thioallophanate with dimethyl sulfate and sodium hydroxide.

4. A process for preparing methyl 2-benzimidazole-carbamate comprising heating to a temperature of 80° to 110° C. dimethyl 4,4'-(1,2-phenylenebis)-3-thioallophanate with dimethyl sulfate and sodium hydroxide.

References Cited

UNITED STATES PATENTS

| | | | |
|---|---|---|---|
| 3,010,968 | 11/1968 | Loux | 260—309.2 |
| 3,431,274 | 3/1969 | Schulenberg | 260—309.2 |
| 3,455,948 | 7/1969 | Stedman | 260—309.2 |
| 3,562,290 | 2/1971 | Fawzi | 260—309.2 |
| 3,487,087 | 12/1969 | Sarett et al. | 260—309 |

OTHER REFERENCES

Merck Index 8th ed., p. 342, Rahway, N.J., Merck (1968).

Fieser et al., Reagents for Organic Synthesis, pp. 192–3, New York, Wiley (1967).

Derwent Belgian Patents Report No. 12/69, Nos. 720891–721221, issued Apr. 23, 1969.

Granik et al., Rus. Chem. Rev. (1971), vol. 40, pp. 747–59.

NATALIE TROUSOF, Primary Examiner

U.S. Cl. X.R.

260—470, 999